Patented Jan. 9, 1951

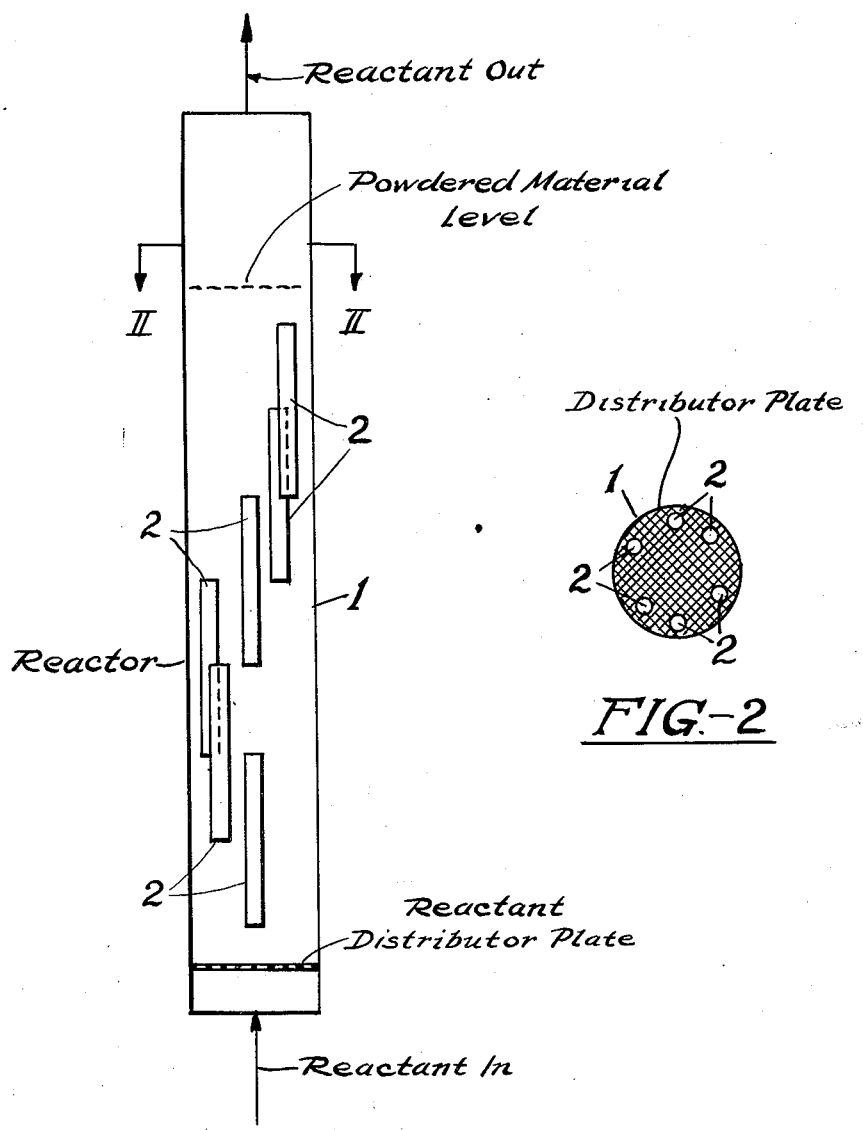

2,537,685

UNITED STATES PATENT OFFICE 2,537,685

FLUIDIZED CATALYST APPARATUS

George L. Matheson, Union, N. J., assignor to Standard Oil Development Company, a corporation of Delaware Application December 29, 1945, Serial No. 638,434

4 Claims. (Cl. 23—288)

This invention relates to an improvement in processing employing fluidized solids, and in particular it relates to a means by which efficient contact between the gas or vapor and the fluidized material can be maintained.

In the fluidizing of finely divided material, four factors are particularly important: the specific gravity and particle size of the solid material, the viscosity of the gas or vapor, and the gas or vapor velocity. Thus, the greater the specific gravity and the greater the particle size of the solid material, the lower the viscosity of the gas and the greater the vapor velocity, the more pronounced is the tendency to form gas cavities in the fluid bed. The formation of gas cavities may be so extensive as to segregate portions of the fluidized mass between large gas cavities or to give rise to slug formation in the mass as it is commonly termed. When slug formation occurs to a substantial extent, quantities of the fluidized solids are pushed up and may be ejected from the containing equipment if the vessel has not sufficient capacity. The behavior resembles the sudden overflows of liquid from many distillation systems in which petroleum distillates containing water are undergoing treatment.

Moreover, the efficiency of treatment and the maintenance of uniform temperature conditions throughout the treating system are dependent upon a substantial homogeneity of the fluidized mass. The presence of relatively large separated volumes of solid and fluid is a particular treating disadvantage and also decreases the capacity of the system. The present invention relates to a means by which the development of gas or fluid cavities in fluidized solid systems is hindered and practically eliminated. The apparatus contemplated is shown diagrammatically in Fig. 1 of the accompanying drawings, and in Fig. 2 which is a horizontal section along the line II—II of Fig. 1.

It has been found that when a number of vertically arranged open end ventilation tubes I of length approximately two to four times the diameter of the containing vessel 2 are disposed vertically throughout the treating system, the formation of gas or fluid cavities is substantially prevented due to the collapse of the gas cavities. The number, the length, and the internal diameter of the tubes required in any particular treating system depend partially upon the factors important in a fluidizing of the original materials, but mainly upon the dimensions of the treating vessel. The length of the individual tubes may be between one and four, but usually between two and four, times the diameter of the containing vessel. It is essential, however, that the tubes be disposed vertically within the volume of the fluidized mass so as to overlap in space connection throughout the vertical length to an extent of between about 20% and 60%, but usually between 25% and 50%, and also extend from almost the bottom of the containing vessel to the free surface of the fluidized mass.

In the arrangement of the tubes within a containing vessel, the tubes may be aligned vertically almost one above the other, that is, in close vertical arrangement. It is preferable, however, to have the tubes distributed around the periphery of the containing vessel as shown in Figs. 1 and 2. This latter arrangement of the tubes disposes them in a substantially spiral path about the periphery, obviates the "short-circuiting" or "blow-through" of the fluidizing gas or vapor through the lines of tubes when aligned vertically, and facilitates their function as ventilation tubes for any gas cavities that may be formed in the system.

As a specific illustration of the invention, a reaction system containing a bed of fluidized siliceous material may be taken. With a superficial air velocity of 0.7 feet through a bed of finely divided siliceous material 13 inches deep in a tube of 1½ inches in diameter and 32½ inches in length, a number of sudden overflows from the tube of the finely divided solid material occurred. With the placing in close vertical alignment of six ventilation tubes, each 6 inches long, so that about 45% of their length overlaps, the maximum rise of the free surface of the finely divided material was 10 inches and it was clearly apparent by direct observation that the formation of slugs was impeded in the initial stages of development.

What is claimed is:

1. Apparatus for contacting a gaseous material with a finely divided solid to be fluidized by said material, comprising a vertically disposed, elongated, contacting chamber, having upper and lower ends, an inlet for said gaseous material at the lower end of said chamber and an outlet for contacted material at the upper end thereof, a plurality of tubular, ventilator elements disposed in said chamber as a vertically extended series of such elements, including uppermost and lowermost elements with a plurality of intermediate elements therebetween, each element of the series being of relatively small cross section, open at each end to permit substantially unimpeded upflow of gaseous materials therethrough, said elements being arranged in the series in overlapping, laterally spaced, parallel relationship with each intermediate element, overlapped at each end by at least one element next adjoining in the series, and a perforate gaseous material distributor plate disposed transversely of the chamber immediately below the lowermost tubular element in the series and vertically spaced therefrom, said chamber adapted to contain a bed of finely divided solids extending substantially from said plate to a level above the uppermost element in said series of elements, and being substantially free of transverse structure impeding the flow of gaseous material through said bed between the lowermost and uppermost tubular elements.

2. Apparatus according to claim 1, in which said tubular elements are disposed peripherally of the reactor vessel.

3. Apparatus according to claim 1, in which the length of each tubular element is not less than the diameter of the vessel, and not more than four times the diameter of said vessel.

4. Apparatus according to claim 1, in which said tubular elements are disposed in overlapping relation, one to another, by from 20% to 60% of their respective lengths.

GEORGE L. MATHESON.

REFERENCES CITED

The following references are of record in the file of this patent:

UNITED STATES PATENTS

| Number | Name | Date |
|---|---|---|
| 2,367,281 | Johnson | Jan. 16, 1945 |